United States Patent
Inoue et al.

(10) Patent No.: US 7,774,122 B2
(45) Date of Patent: Aug. 10, 2010

(54) VEHICLE CONTROLLER

(75) Inventors: Gen Inoue, Susono (JP); Yasuhito Ishida, Toyokawa (JP)

(73) Assignees: Toyota Jidosha Kabushiki Kaisha, Toyota-shi (JP); Advics Co., Ltd., Kariya (JP)

( * ) Notice: Subject to any disclaimer, the term of this patent is extended or adjusted under 35 U.S.C. 154(b) by 880 days.

(21) Appl. No.: 11/503,959

(22) Filed: Aug. 15, 2006

(65) Prior Publication Data

US 2007/0061059 A1  Mar. 15, 2007

(30) Foreign Application Priority Data

Sep. 14, 2005  (JP) .............................. 2005-266572

(51) Int. Cl.
*G05D 17/00* (2006.01)
(52) U.S. Cl. .......................................... 701/84; 701/82
(58) Field of Classification Search ................. 701/110, 701/82, 84
See application file for complete search history.

(56) References Cited

U.S. PATENT DOCUMENTS

| | | | | |
|---|---|---|---|---|
| 4,918,744 | A * | 4/1990 | Shimizu ..................... 388/833 |
| 5,233,530 | A * | 8/1993 | Shimada et al. ............ 701/107 |
| 6,006,144 | A * | 12/1999 | Takahashi et al. .............. 701/1 |
| 6,226,593 | B1 * | 5/2001 | Kurz et al. .................. 701/301 |
| 6,538,411 | B1 * | 3/2003 | Field et al. .................. 318/638 |
| 6,571,165 | B2 * | 5/2003 | Maruko et al. ................ 701/93 |
| 7,155,342 | B2 * | 12/2006 | Kobayashi et al. .......... 701/301 |
| 2001/0027372 | A1 * | 10/2001 | Hellmann et al. ............. 701/96 |
| 2002/0005304 | A1 * | 1/2002 | Bachman et al. ........... 180/65.3 |
| 2002/0026273 | A1 * | 2/2002 | Tamura et al. ................ 701/70 |
| 2003/0125847 | A1 * | 7/2003 | Tinskey et al. ................. 701/1 |
| 2004/0251651 | A1 * | 12/2004 | Yamamoto et al. ..... 280/124.128 |
| 2005/0004761 | A1 * | 1/2005 | Takahama et al. ........... 701/301 |
| 2005/0090984 | A1 * | 4/2005 | Kobayashi et al. .......... 701/301 |
| 2007/0150158 | A1 * | 6/2007 | Inoue et al. .................... 701/93 |

FOREIGN PATENT DOCUMENTS

| | | |
|---|---|---|
| CN | 1535854 A | 10/2004 |
| JP | 8-200111 | 8/1996 |
| JP | 9-48263 | 2/1997 |
| JP | 2001-310654 | 11/2001 |
| JP | 2001-355480 | 12/2001 |
| JP | 2003-89352 | 3/2003 |
| JP | 2003-92803 | 3/2003 |
| JP | 2004-90679 | 3/2004 |
| JP | 2004-306733 | 11/2004 |
| JP | 2005-20891 | 1/2005 |
| JP | 2007-45230 | 2/2007 |

* cited by examiner

*Primary Examiner*—Mark Hellner
*Assistant Examiner*—Ari M. Diacou
(74) *Attorney, Agent, or Firm*—Oblon, Spivak, McClelland, Maier & Neustadt, L.L.P.

(57) ABSTRACT

A vehicle controller includes an obstacle-determining portion and a driving torque reducing portion. The obstacle-determining portion determines whether the vehicle is climbing up an obstacle, more specifically, whether the vehicle starts climbing up the obstacle. Then, the driving torque reducing portion performs a driving torque reduction control when it is determined that the vehicle is climbing up onto the obstacle.

20 Claims, 9 Drawing Sheets

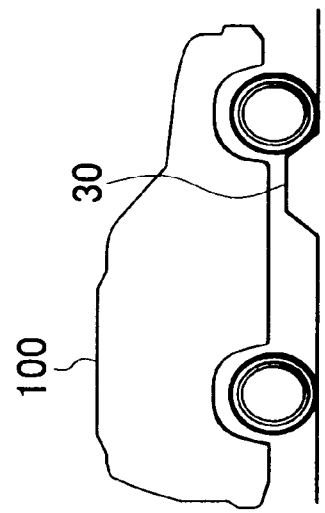
F I G. 2A
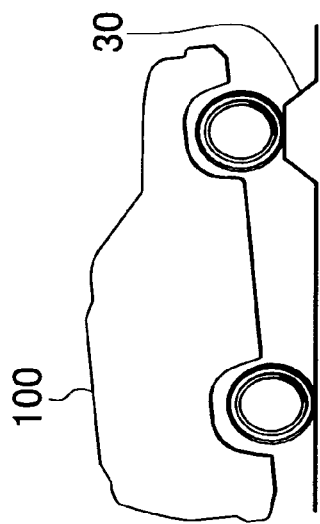
F I G. 2B
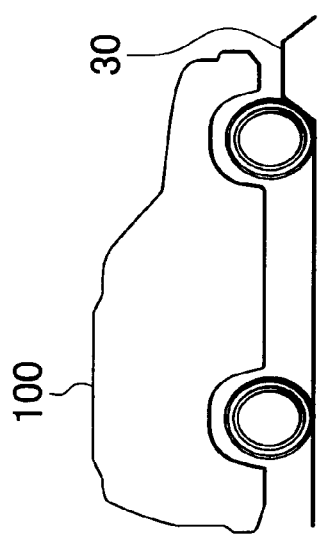
F I G. 2C

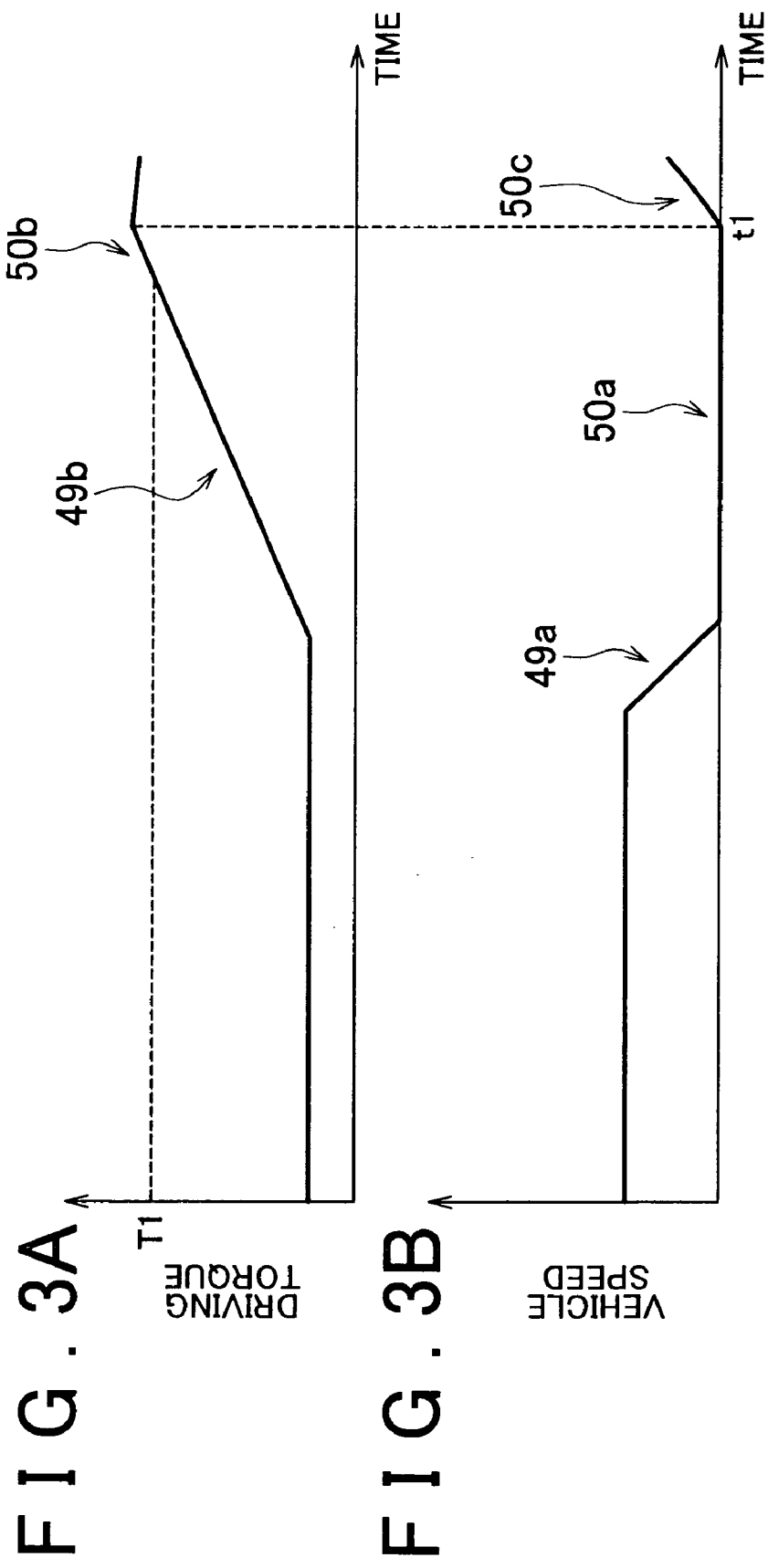

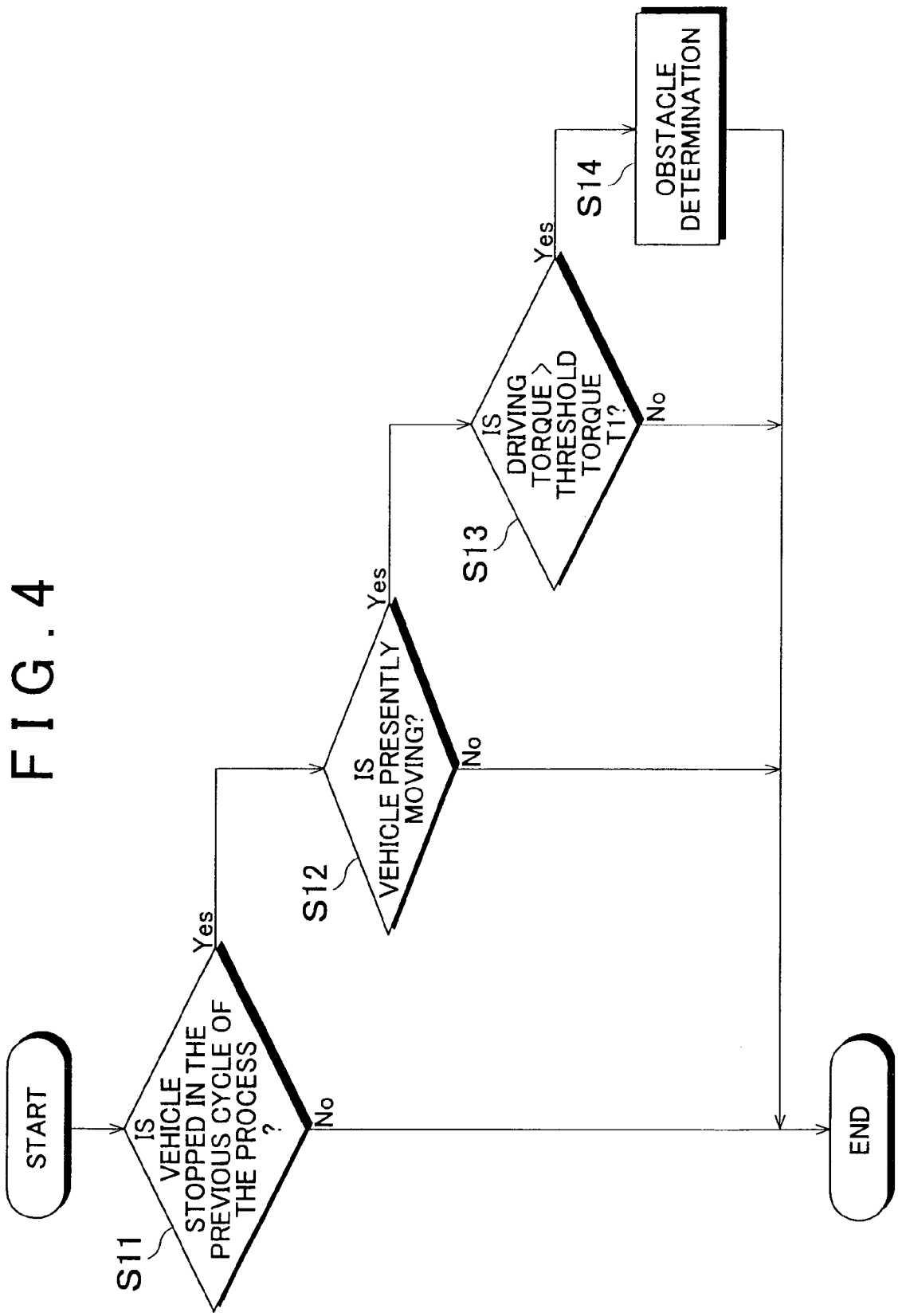

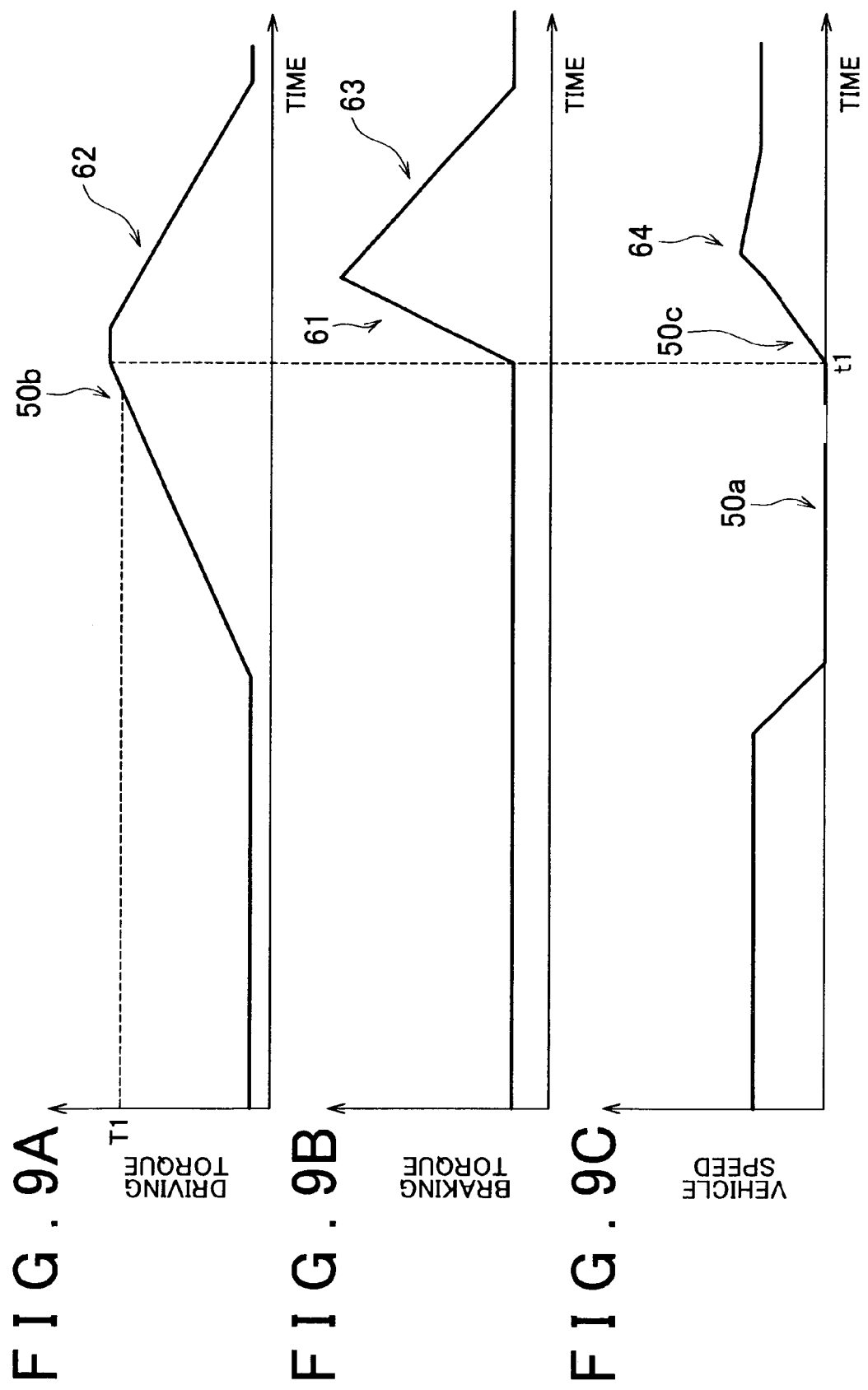

VEHICLE CONTROLLER

INCORPORATION BY REFERENCE

The disclosure of Japanese Patent Application No. 2005-266572 filed on Sep. 14, 2005 including the specification, drawings and abstract is incorporated herein by reference in its entirety.

BACKGROUND OF THE INVENTION

1. Field of the Invention

The invention relates to a vehicle controller.

2. Description of the Related Art

A conventional technology, which controls a driving torque (driving force), a braking torque (braking force), and the like when a vehicle runs on an inclined road and the like, has been known. For example, a creep control apparatus is disclosed in Japanese Patent Application Publication No. JP-A-2004-90679. The creep control apparatus adjusts the braking force and the driving force so that the vehicle speed is maintained within a certain range when a driver does not intend to accelerate the vehicle or wants the vehicle to continue moving.

However, the technology disclosed in Japanese Patent Application Publication No.JP-A-2004-90679 does not appropriately control increases in the vehicle speed that may occur after the vehicle has gotten on an obstacle (in particular, when the vehicle is coming down on the other side of the obstacle). Therefore, the vehicle speed may suddenly change, which may cause the occupants to feel discomfort.

SUMMARY OF THE INVENTION

According to a first aspect of the invention, a vehicle controller includes an obstacle-determining portion that determines whether a vehicle is climbing up an obstacle, and a driving torque reducing portion that performs the driving torque reduction control that reduces the driving torque when the obstacle-determining portion determines that the vehicle is climbing up an obstacle.

The vehicle controller according to the first aspect of the invention is used to control the driving force applied to the vehicle when the vehicle climbs up an obstacle (that is, during the period from when the vehicle begins to climb up the obstacle until the vehicle comes down on the other side of the obstacle). The obstacle-determining portion determines whether the vehicle is climbing up an obstacle, more specifically, whether the vehicle is beginning to climb up an obstacle. When it is determined that the vehicle is climbing up an obstacle, the driving torque reducing portion performs a driving torque reduction control. This makes it possible to suppress rapid increases in the vehicle speed (sudden start) when the vehicle comes down on the other side of the obstacle. Accordingly, discomfort of the occupants can be reduced when the vehicle goes over the obstacle.

A method for controlling a driving torque of a vehicle according to a second embodiment of the invention determines whether the vehicle is climbing up an obstacle and performs a driving torque reduction control that reduces the driving torque applied to the vehicle when it is determined that the vehicle is climbing up an obstacle.

BRIEF DESCRIPTION OF THE DRAWINGS

The foregoing and/or further objects, features and advantages of the invention will become more apparent from the following description of example embodiments with reference to the accompanying drawings, in which the same of corresponding portions are denoted by the same reference numerals and wherein:

FIGS. 2A to 2C show conditions of the vehicle when the vehicle goes over an obstacle.

FIGS. 3A and 3B are views for describing a basic concept of an obstacle-determining method in the embodiment of the invention;

FIG. 4 is a flowchart showing an obstacle-determining process according to the embodiment of the invention;

FIGS. 9A to 9C show changes of the driving torque, breaking torque and the vehicle speed when the process to reduce the driving torque according to the second embodiment of the invention is performed.

DETAILED DESCRIPTION OF THE PREFERRED EMBODIMENTS

A preferred embodiment of the invention will be described below with reference to the attached drawings.

I. Configuration of Vehicle

The overall configuration of a vehicle that includes a vehicle controller according to an embodiment of the invention is described with reference to FIG. 1.

Figure 1:
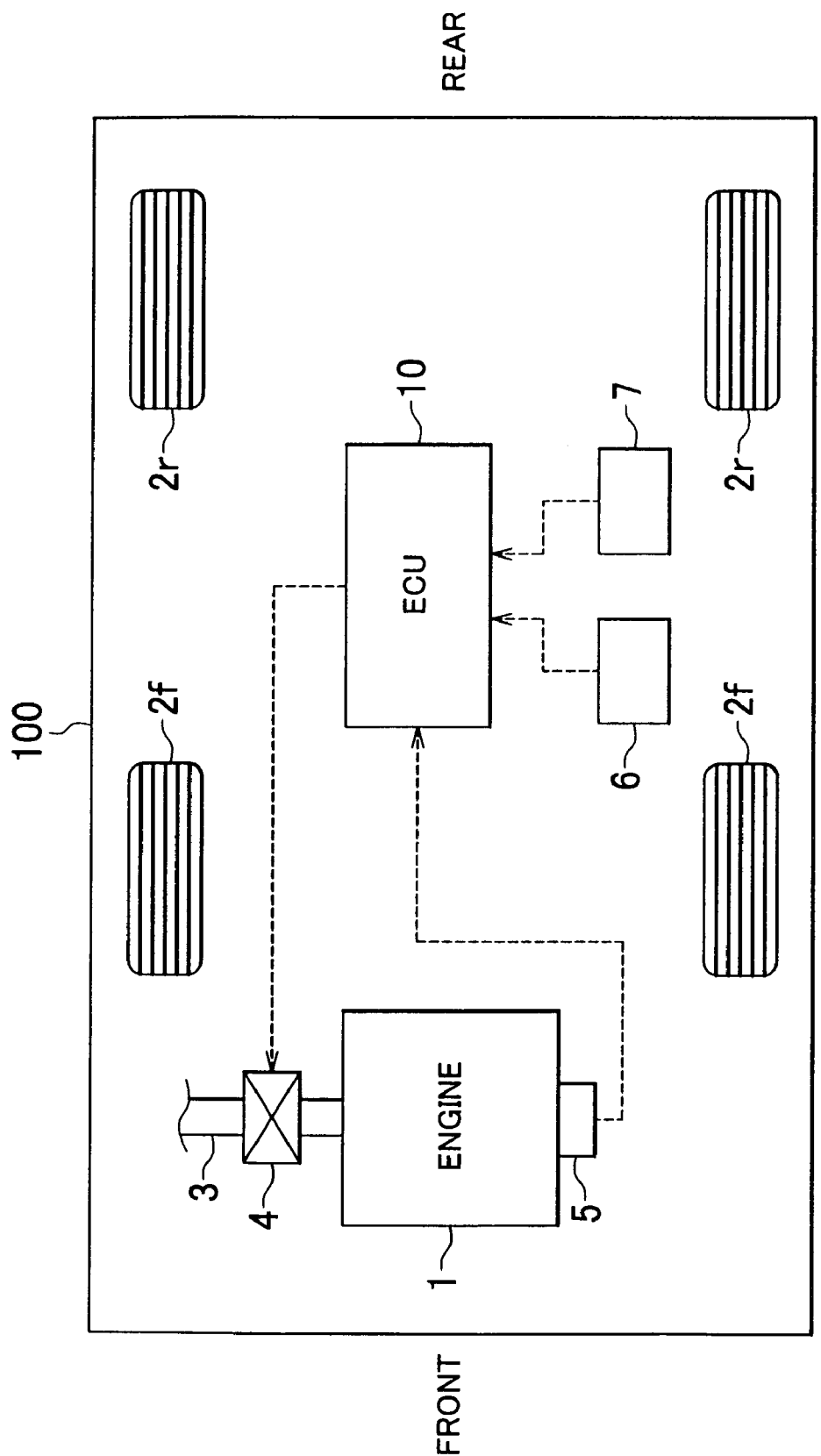
FIG. 1 is a schematic view of the configuration of a vehicle that includes a vehicle controller according to an embodiment of the invention.

FIG. 1 is a schematic view of the configuration of a vehicle 100 as viewed from above. The left side and the right side in the drawing indicate the front and the rear of the vehicle 100, respectively. A dotted arrow in the drawing indicates input and output of a signal.

The vehicle 100 includes an engine (internal combustion engine) 1, a pair of front wheels 2f, a pair of rear wheels 2r, a throttle valve 4, a torque sensor 5, a vehicle speed sensor 6, an acceleration sensor (G sensor) 7, and an engine control unit (ECU) 10.

The engine 1 is an internal combustion engine that combusts a mixture of air and fuel in a combustion chamber to generate power. The power generated by the engine 1 is transmitted to at least either of the front wheels 2f and the rear wheels 2r through a torque converter, a transmission, and a drive shaft (not shown).

Air is supplied to the engine 1 through an intake passage 3. The throttle valve 4 provided in the intake passage 3 adjusts the amount of air supplied to the engine 1. The throttle valve 4 is controlled by the ECU 10.

The torque sensor 5 detects the driving torque output from the engine 1, and the vehicle speed sensor 6 detects the speed of the vehicle 100 (that is, vehicle speed). The acceleration sensor 7 detects the acceleration of the vehicle 100 and the grade of the road where the vehicle is currently running. The values detected by the above sensors are output to the ECU 10 as detection signals.

The ECU 10 includes a CPU, a ROM, a RAM, A/D converters, an input/output interface, and the like. The ECU 10 makes various determinations and performs various controls based on the detection signals supplied from the aforementioned sensors. In the embodiment, the ECU 10 determines whether the vehicle 100 is climbing up an obstacle based on the detection signals, and executes controls to reduce the driving torque that is supplied to the vehicle 100 in accordance with the determination result. As described herein, the ECU 10 functions as means for determining whether the vehicle is climbing up an obstacle (hereinafter, "obstacle-determining means") and driving torque control means.

II. Obstacle-determining Method

An obstacle-determining method according to the embodiment of the invention will next be described with reference to FIGS. 2 to 4.

FIGS. 2A to 2C show conditions of the vehicle 100 when the vehicle 100 goes over an obstacle 30 (a period from when the vehicle 100 begins to climb up the obstacle 30 until the vehicle 100 comes down on the other side of the obstacle 30). In FIGS. 2A to 2C, it is assumed that the vehicle runs from the left to the right in the drawing. The obstacle 30 is not limited to obstacles on a road, but may include various other obstacles, such as stones in an off-road area.

FIG. 2A is a view showing the initial contact of the vehicle 100 with the obstacle 30. In this case, when the vehicle 100 contacts the obstacle 30, the vehicle speed is briefly reduced to substantially 0. Then the driving torque of the vehicle 100 is increased so as to go over the obstacle 30. FIG. 2B shows a vehicle 100 when it is on top of the obstacle 30. In this case, when the driving torque reaches a torque level necessary for the vehicle 100 to climb up the obstacle 30, the vehicle speed increases from the state where the vehicle speed is substantially 0, and the vehicle 100 starts climbing up the obstacle 30.

FIG. 2C shows the vehicle 100 as it comes down the other side of the obstacle 30. Normally, the driving torque is large immediately after the vehicle 100 reaches the top of the obstacle 30, and thus subsequently the vehicle speed tends to increase. Therefore, when the vehicle 100 comes down on the other side of the obstacle 30, inertia accelerates the vehicle 100, and the vehicle speed further increases. Accordingly, occupants of the vehicle 100 may feel discomfort due to a rapid change of the vehicle speed.

In the embodiment, it is appropriately determined whether the vehicle 100 is climbing up the obstacle 30, and, if it is determined that the vehicle 100 is climbing up the obstacle 30, a control to reduce the driving torque is executed to suppress rapid increases in the vehicle speed (sudden start) when the vehicle 100 comes down the obstacle 30. The obstacle-determining method in the embodiment will be described below.

FIG. 3 depicts a basic concept of the obstacle-determining method according the embodiment. FIG. 3 shows specific examples of a change of the driving torque that is applied to the vehicle 100 and a change of the vehicle speed during the period from when the vehicle 100 contacts the obstacle 30 until the vehicle 100 starts going over the obstacle 30. In FIG. 3A, a horizontal axis shows time, and a vertical axis shows the driving torque. In FIG. 3B, a horizontal axis shows time, and a vertical axis shows the vehicle speed.

First, the vehicle 100 contacts the obstacle 30, and the vehicle speed, which has been maintained to be substantially constant, is reduced to substantially 0, as shown by an arrow 49a. This condition corresponds to the condition shown in FIG. 2A. Then, in order to climb up the obstacle 30, the driving torque is increased as shown by an arrow 49b. In this case, the vehicle speed remains substantially 0, as shown by an arrow 50a, until the vehicle 100 begins climbing up the obstacle 30.

Subsequently, the driving torque continues to increase as shown by the arrow 50b. When the vehicle starts climbing up the obstacle at time t1, the vehicle speed increases from substantially 0, as shown by an arrow 50c. In other words, a certain level of the driving torque (that is, the driving torque necessary for the vehicle to go over the obstacle) is applied to the vehicle, and the vehicle speed increases from substantially 0. This means that the vehicle 100 begins to climb up the obstacle 30.

In this way, it is possible to determine whether the vehicle 100 is climbing up the obstacle 30 (specifically, whether the vehicle 100 starts climbing up the obstacle 30), based on the vehicle speed and the driving torque. More specifically, in the embodiment, when the vehicle speed starts increasing from substantially 0, after the vehicle speed is briefly reduced to 0, and the driving torque exceeds a threshold torque T1, it is determined that the vehicle 100 is climbing up the obstacle 30. However, even if the vehicle speed increases from 0, it is considered a normal start of the vehicle from a standstill if the driving torque applied to the vehicle is below a threshold level. Therefore, the threshold torque value T1 is set larger than at least the driving torque that is normally output when the vehicle 100 starts moving from a standstill.

FIG. 4 is a flowchart showing an obstacle-determining process according to the embodiment. The ECU 10 periodically performs the process at specified time intervals. Specifically, the ECU 10 performs the process based on the vehicle speed detected by the vehicle speed sensor 6 and the torque of the engine 1 detected by the torque sensor 5. The driving torque controlled in the process is the driving torque that is finally applied to the vehicle 100, and is determined based on the torque output from the engine 1 (that is, the torque detected by the torque sensor 5).

First, in step S11, the ECU 10 determines whether the vehicle was at a standstill in the previous cycle of the process. Specifically, the ECU 10 determines whether the vehicle speed has been substantially 0 in the previous cycle. If the vehicle 100 was at a standstill (step S11: Yes), the process proceeds to step S12. If the vehicle 100 was not at a standstill (step S11: No), the ECU 10 terminates the process in the present cycle. In this case, it is determined that the vehicle 100 is not climbing up the obstacle 30.

In step S12, the ECU 10 determines whether the vehicle is presently in motion. Specifically, the ECU 10 determines whether the present vehicle speed corresponds to substantially 0. If the vehicle is in motion (step S12: Yes), the process proceeds to step S13. In this case, because the vehicle was at a standstill in the previous cycle of the process (step S11: Yes), and the vehicle is presently in motion, it is determined that the vehicle speed is increasing from 0 after the vehicle speed is briefly reduced to 0.

If the vehicle is not in motion (step S12: No), the ECU terminates the process in the present cycle. That is, since the fact that the vehicle speed was substantially 0 in the previous cycle and is also substantially 0 in the present cycle shows that the vehicle speed has not increased. Thus, it is determined that the vehicle is not climbing up the obstacle 30.

On the other hand, in step S13, the ECU 10 determines whether the driving torque applied to the vehicle 100 exceeds the threshold torque T1. The threshold torque T1 is a torque value that is considered to be necessary for the vehicle to climb up onto the obstacle. The threshold torque T1 is determined based on the grade of the inclined road detected by the acceleration sensor 7, the gear ratio of the transmission, the vehicle weight, and the diameter of the wheels (the front wheels 2f and the rear wheels 2r). Specifically, the ECU 10 refers to a map defined by the grade of the inclined road and the gear ratio and determines the threshold torque T1.

When the driving torque is larger than the threshold torque T1 (step S13: Yes), the vehicle 100 is considered to climb up the obstacle 30. That is, since the vehicle speed increases from 0 (step S11: Yes, and step S12: Yes), and the driving torque is larger than the threshold torque T1, the process proceeds to step S14. In step S14, the ECU 10 determines that the vehicle 100 is climbing up onto the obstacle (obstacle determination). When the driving torque is equal to or smaller than the threshold torque T1 (step S13: No), the ECU terminates the process in the present cycle. The process is terminated because when the driving torque is equal to or smaller than the threshold torque T1, even if the vehicle speed increases from substantially 0, it is determined that the vehicle 100 is starting to move from a standstill instead of climbing up the obstacle 30.

The obstacle-determining process according to the embodiment is herein compared to other methods. In comparison, an obstacle-determining method may determine whether a vehicle is climbing up an obstacle based on the time during which the vehicle runs at a speed exceeding a reference speed, and maximum wheel acceleration. However, the method can make the determination only when the vehicle speed is medium or high, and thus the determination may not be appropriately made if the vehicle speed is low. On the other hand, the obstacle-determining process according to the embodiment, however, makes the determination based on whether the vehicle speed increases from 0 and whether the driving torque is larger than the threshold torque T1. Therefore, even at low vehicle speeds, it is possible to reliably determine that the vehicle 100 is climbing up the obstacle 30. Accordingly, compared to the obstacle-determining process of the comparative example, the obstacle-determining process according to the embodiment can determine, in more appropriate manner, whether the vehicle 100 is climbing up the obstacle 30.

It should be noted, however, that the invention is not limited to performing an obstacle-determining process based on whether the vehicle speed increases from 0. In another example, when the driving torque exceeds the threshold torque T1 in a condition where a substantially constant vehicle speed has been maintained, it is determined that the vehicle 100 is climbing up the obstacle 30. Further, the obstacle-determining process according to the embodiment may be similarly performed when the rear wheels 2r, as well as the front wheels 2f, go up onto the obstacle 30.

III. Method to Reduce Driving Torque

A first example and a second example of a method to reduce the driving torque according to the embodiment of the invention will be specifically described. In the embodiment according to the invention, when it is determined that the vehicle 100 is climbing up the obstacle 30, the driving torque applied to the vehicle 100 is reduced. This control is performed to suppress a rapid increase of the vehicle speed when the vehicle 100 comes down from the obstacle 30.

A. FIRST EXAMPLE

The first example of the method to reduce the driving torque of the first embodiment will be described with reference to FIG. 5 and FIGS. 6A and 6B. This method is performed with the vehicle 100 (refer to FIG. 1).

Figure 5:
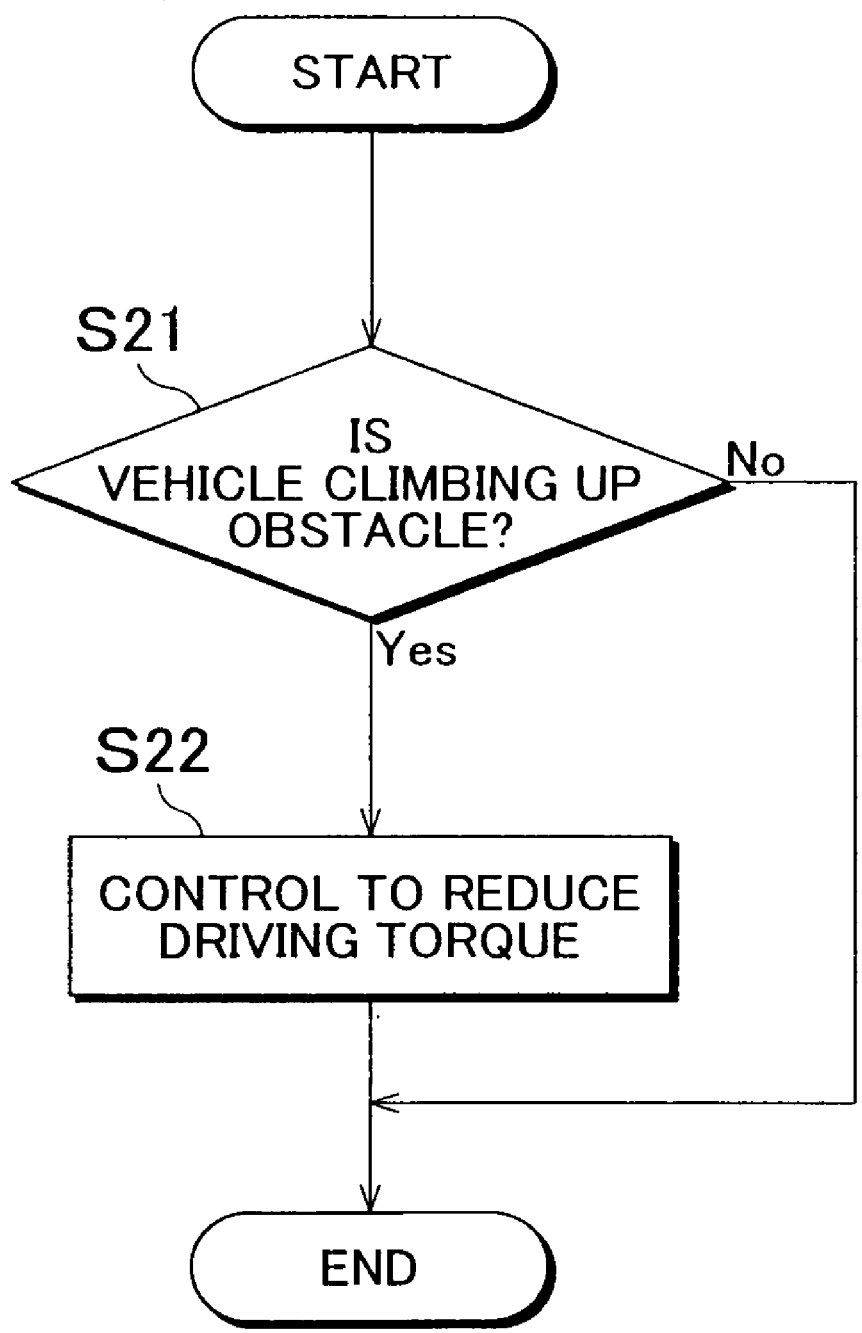
FIG. 5 is a flowchart showing a process to reduce the driving torque according to a first embodiment of the invention.

FIG. 5 is a flowchart showing the process of reducing the driving torque according to the first example. The process is also executed by the ECU 10.

In step S21, first of all, the ECU 10 determines whether the vehicle 100 is climbing up an obstacle. More specifically, the ECU 10 performs the obstacle-determining process shown in FIG. 4. If it is determined that the vehicle 100 is climbing up an obstacle (step S21: Yes), the process proceeds to step S22. If it is determined that the vehicle 100 is not climbing up an obstacle (step S21: No), the ECU 10 terminates the process in the present cycle.

In step S22, the ECU 10 performs a control to reduce the driving torque output from the engine 1 so as to suppress the increase of the vehicle speed when the vehicle 100 comes down on the other side of the obstacle 30 (hereinafter, "driving torque reduction control"). The driving torque reduction control corresponds to a first control. More specifically, the ECU 10 executes a control to throttle the throttle valve 4 (that is, a control to reduce the opening of the throttle valve) so as to reduce an amount of air supplied to the engine 1. Thus, the driving torque output from the engine 1 is reduced. When the process is completed, the ECU 10 terminates the process in the present cycle.

Figure 6:
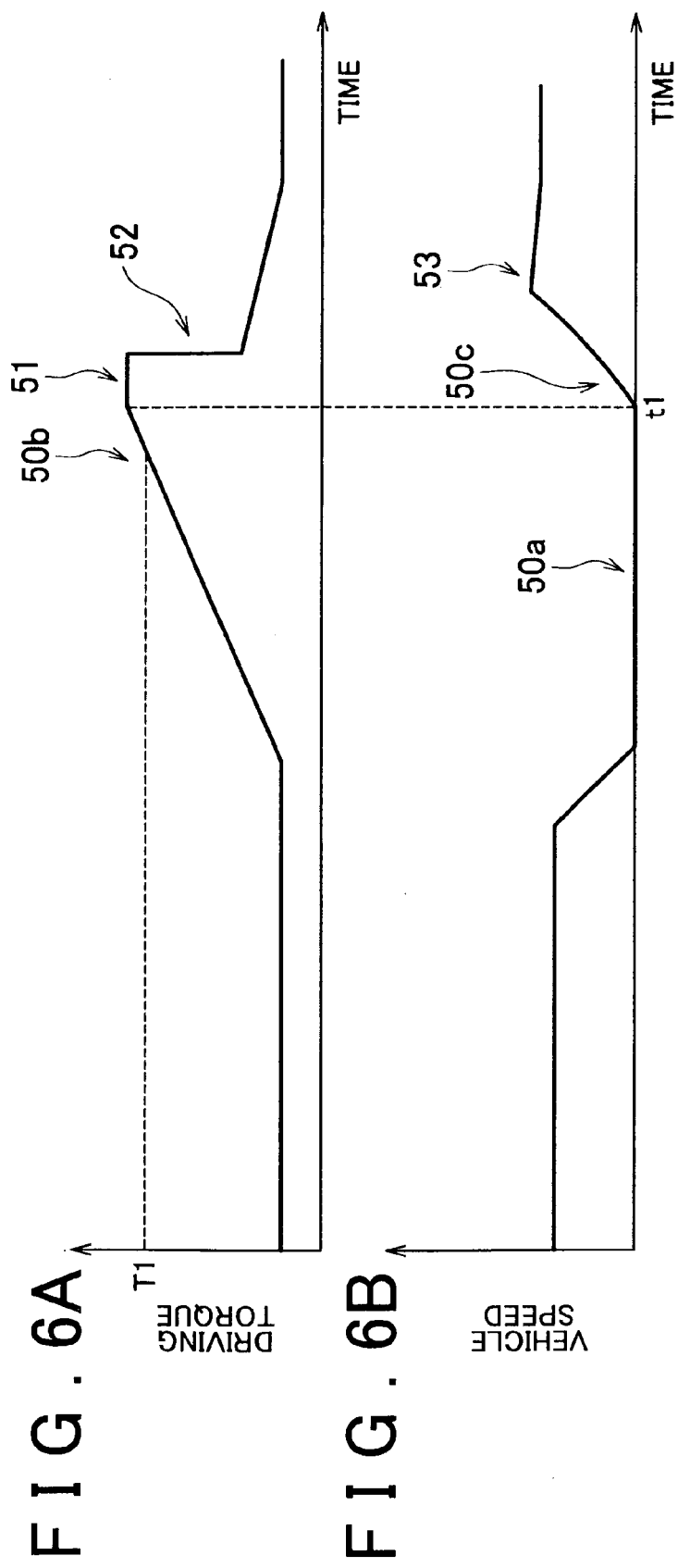
FIGS. 6A and 6B show changes of the driving torque and the vehicle speed when the driving torque reduction is performed according to the first embodiment of the invention.

FIGS. 6A and 6B specifically show an example of a change of the driving torque applied to the vehicle 100 and a change of the vehicle speed when the process to reduce the driving torque according to the first embodiment is performed. In FIG. 6A, a horizontal axis shows time, and a vertical axis shows driving torque. In FIG. 6B, a horizontal axis shows time, and a vertical axis shows vehicle speed.

As shown by arrows 50a and 50c, the vehicle speed increases from substantially 0 at time t1. Further, as shown by an arrow 50b, the driving torque exceeds the threshold torque T1 at time t1. Therefore, the ECU 10 determines that the vehicle 100 is climbing up an obstacle. After it is determined at time t1 that the vehicle is climbing up an obstacle, the ECU 10 gradually chokes the throttle valve 4. At the initial stage of throttling the throttle valve 4, as shown by an arrow 51, the driving torque does not immediately decrease but remains substantially constant. Then, after a certain length of time has passed after the start of throttling throttle valve 4, the driving torque starts to decrease sharply as shown by the arrow 52. Therefore, when the vehicle 100 comes down from the obstacle 30, the vehicle speed is not increased but maintained to be substantially constant as shown by an arrow 53. More specifically, the vehicle speed when the vehicle 100 gets on top of the obstacle 30 and the vehicle speed when the vehicle 100 comes down from the obstacle 30 can be made substantially the same. Accordingly, this makes it possible to alleviate discomfort of the occupants when the vehicle 100 comes down from the obstacle 30.

The amount of reduction in the driving torque may be determined in accordance with the grade of the road on which the vehicle is traveling. More specifically, the ECU 10 determines the amount of reduction in the driving torque so that the driving torque that is finally applied to the vehicle 100 is always larger than a "road grade torque". The "road grade torque" means the torque necessary for the vehicle 100 to climb a road of a particular grade of incline. That is, the road grade torque means the torque necessary for the vehicle 100 to run at a constant speed when the vehicle 100 runs on a road of equivalent grade with no obstacle. The road grade torque is calculated by the ECU 10 based on the grade of the road detected by the acceleration sensor 7. By determining the amount of reduction in the driving torque as described above, the minimum required torque can be obtained. Accordingly, the vehicle 100 can appropriately run after going down the obstacle 30.

The time at which to start the reduction of the driving torque (the time at which the driving torque applied to the vehicle 100 actually starts decreasing) may be determined in the following procedure. First, when it is determined that the vehicle 100 is climbing up an obstacle, the ECU 10 estimates the height of the obstacle 30 based on the driving torque. Next, the ECU 10 estimates the distance that the vehicle 100 needs to move in order to climb up the obstacle 30 based on the estimated height of the obstacle 30. The ECU 10 then sets the time when the vehicle 100 has moved the estimated distance as the time to start the reduction of the driving torque. The time to start reduction of the driving torque is determined as above because reducing the torque immediately after the vehicle 100 starts to climb up the obstacle 30 may prevent the vehicle 100 from successfully going over the obstacle 30. That is, the time to start reducing the driving torque is determined such that the vehicle 100 can go over the obstacle 30 in an appropriate manner. In addition, even when the vehicle 100 is running on an inclined road with the road grade torque, the height of the obstacle 30 can be appropriately estimated based on the driving torque that is applied when it is determined that the vehicle 100 is climbing up the obstacle.

Basically, the driving torque does not immediately decrease when the throttle valve 4 is throttled. Therefore, the problem described above rarely occurs, even if the throttle valve 4 is throttled immediately after it is determined that the vehicle 100 is climbing up the obstacle. Accordingly, if appropriate, it is possible to throttle the throttle valve 4 immediately after it is determined that the vehicle 100 begins climbing up the obstacle.

If the vehicle 100 goes over a successive obstacle 30 after going over one, the ECU 10 may attenuate the torque reduction amount of the driving torque. Specifically, in some cases, the vehicle may fail to go over the obstacle 30 if the driving torque is reduced while the vehicle 100 is climbing up the obstacle 30. In this case, the vehicle speed of the vehicle 100 temporarily becomes 0, and therefore it is necessary to increase the driving torque again and thus the vehicle speed. That is, the obstacle determination (step S14 in FIG. 4) is made again immediately after the vehicle 100 has failed to go over the obstacle 30. To avoid this, the torque reduction amount of the driving torque is reduced so that the vehicle will be able to go over the obstacle 30. In addition, when the vehicle goes over successive obstacles 30 as in this case, the foregoing set distance that the vehicle 100 moves before starting the driving torque reduction may be extended, instead of attenuating the torque reduction amount of the driving torque.

Further, the invention is not limited to the mechanism that reduces the driving torque output from the engine 1 by performing a control to throttle the throttle valve 4. For example, when the vehicle is provided with a turbocharger or the like, the driving torque output from the engine 1 may be reduced by performing a control to reduce a boost pressure.

B. Second Embodiment

A method of reducing the driving torque according to the second embodiment will next be described with reference to FIGS. 7 to 9C. The method performs a control to increase the braking torque applied to the vehicle so that the driving torque applied to the vehicle is reduced, instead of reducing the driving torque output from the engine 1. The second embodiment is different from the aforementioned first embodiment in that regard.

Figure 7:
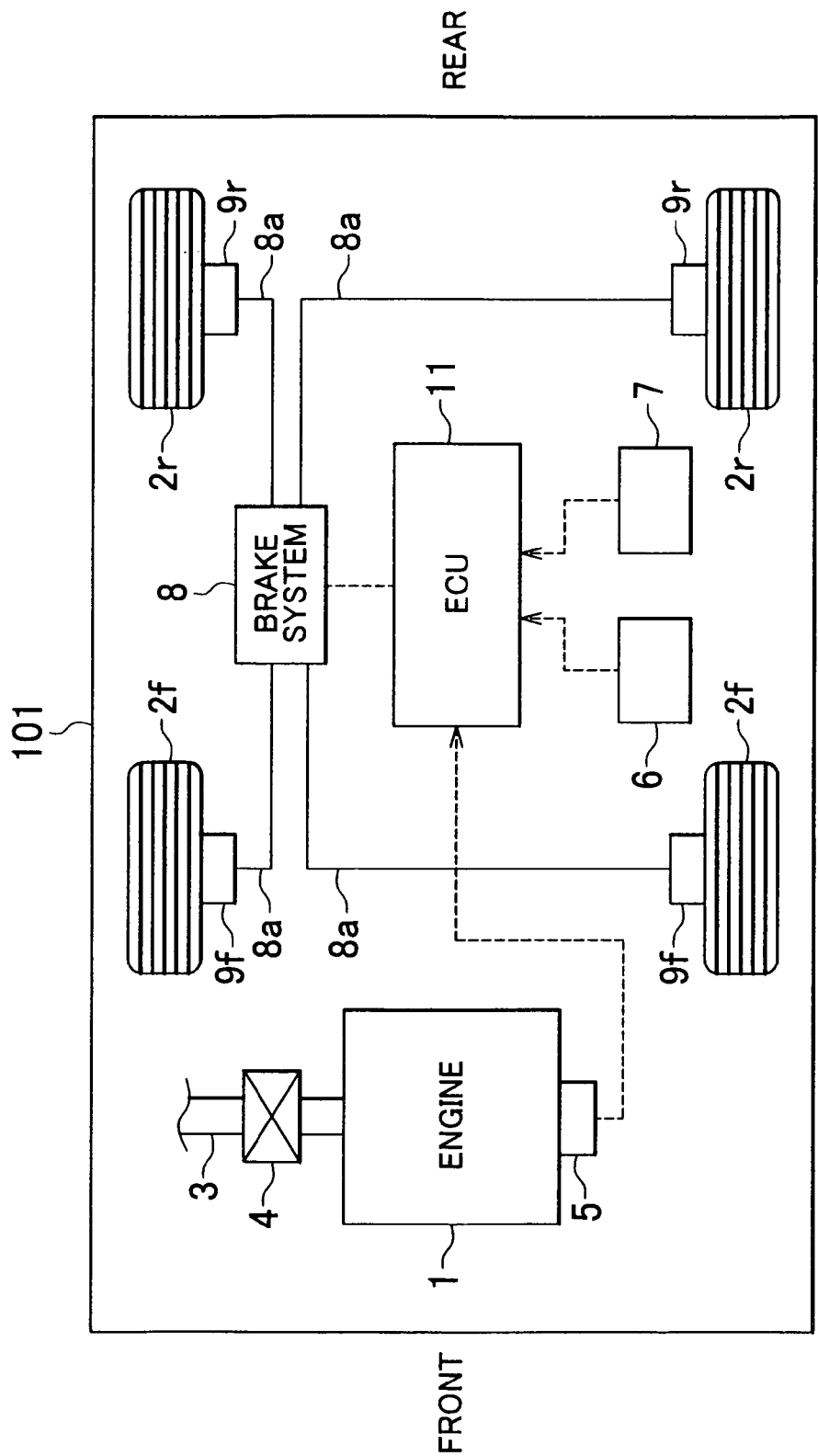
FIG. 7 schematically shows the configuration of a vehicle that includes a vehicular control according to a second embodiment of the invention.

FIG. 7 schematically shows the configuration of a vehicle 101 according to the second embodiment, as viewed from above. In the figure, the left side and the right side in the drawing indicate the front and the rear of the vehicle 101, respectively. A dotted arrow in the drawing indicates input and output of a signal.

The vehicle 101 differs from the vehicle 100 in that the vehicle 101 further includes a brake system 8, an oil passage 8*a*, and friction brakes 9*f* and 9*r* and that the vehicle 101 uses an ECU 11 in place of the ECU 10. The same elements of the second embodiment as in the first embodiment are denoted by the same reference numerals, and descriptions thereof will be omitted.

The brake system 8 is a hydraulic system, which includes a master cylinder, a hydro unit, and the like (not shown). The brake system 8 is connected to the friction brakes 9*f*, 9*r* though the oil passage 8*a*. The friction brakes 9*f*, 9*r* may include, for example, a drum brake, a disc brake, or the like. The friction brakes 9*f*, 9*r* are hydraulically driven by oil supplied from the brake system 8 through the oil passage 8*a*, and the braking torque is applied to the front wheels 2*f* and the rear wheels 2*r*. In this case, the friction brakes 9*f*, 9*r* generate the braking torque in accordance with the pressure of the oil supplied from the brake system 8. The brake system 8 is controlled by the ECU 11.

The ECU 11 includes a CPU, a ROM, a RAM, A/D converters, an input/output interface and the like. The ECU 11 makes various determinations and performs various controls, based on detection signals supplied from various sensors provided in the vehicle 101. In the second embodiment, the ECU 11 determines whether the vehicle 101 is climbing up the obstacle 30 based on the detection signals, and controls the brake system 8 based on a result of the determination so as to apply the braking torque to the vehicle 101. That is, the ECU 11 supplies the braking torque to the vehicle 101 so as to reduce the driving torque supplied to the vehicle 101. This is different from the ECU 10 according to the first embodiment, which reduces the driving torque output from the engine 1.

It should be noted, however, that the invention is not limited to the use of the hydraulic brake system 8 or the like as a mechanism for applying the braking torque to the vehicle 101.

Figure 8:
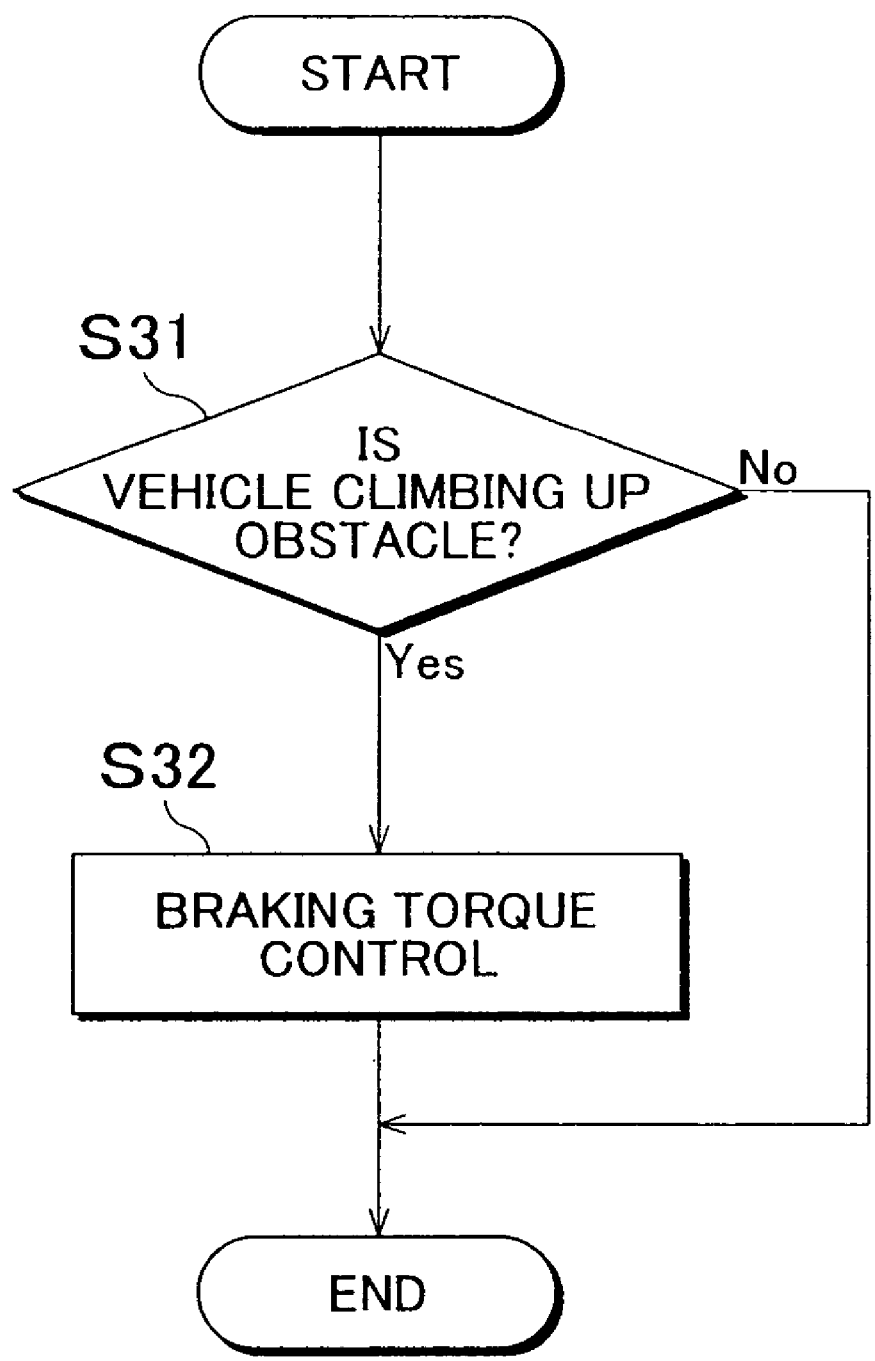
FIG. 8 is a flowchart showing a process to reduce the driving torque according to the second embodiment of the invention.

Next, a process to reduce the driving torque according to the second embodiment will be described with reference to the flowchart shown in FIG. 8. The flowchart shows the process of reducing the driving torque according to the second embodiment. The process is executed by the ECU 11.

First, in step S31, the ECU 11 determines whether the vehicle 101 is climbing up an obstacle. More specifically, the ECU 11 performs the obstacle-determining process shown in FIG. 4. If the vehicle 101 is climbing up an obstacle (step S31: Yes), the process proceeds to step S32. If the vehicle 101 is not climbing up an obstacle (step S31: No), the ECU 11 terminates the process in the present cycle.

In step S32, the ECU 11 performs a control to apply the braking torque to the vehicle 101 (hereinafter, "braking torque control") to suppress an increase of the vehicle speed when the vehicle 101 comes down from the obstacle 30. The braking torque control corresponds to a second control. More specifically, the ECU 11 applies the braking torque to the front wheels 2*f* and the rear wheels 2*r* using the friction brakes 9*f*, 9*r* by controlling the brake system 8. More specifically, the ECU 11 sets the braking torque to be applied to the vehicle 101 to a value obtained by subtracting the road grade torque from the driving torque applied to the vehicle 101. When this process is completed, the ECU 11 terminates the process in the present cycle.

FIGS. 9A to 9C show specific examples of a change of the braking torque applied to the vehicle 101, a time change of the driving torque, and a time change of the vehicle speed when the process to reduce the driving torque according to the second embodiment is performed. In FIG. 9A, a horizontal axis shows time, and a vertical axis shows driving torque. In FIG. 9B, a horizontal axis shows time, and a vertical axis shows braking torque. In FIG. 9C, a horizontal axis shows time, and a vertical axis shows vehicle speed.

As shown by arrows 50*a* and 50*c*, the vehicle speed increases from substantially 0 at time t1. Further, as shown by an arrow 50*b*, the driving torque exceeds a threshold torque T1 at time t1. Therefore, the ECU 11 determines that the vehicle 101 is climbing up an obstacle. After it is determined that the vehicle 101 is climbing up an obstacle at time t1, the ECU 11 applies the braking torque to the vehicle 101 as shown by an arrow 61. Accordingly, the driving torque applied to the vehicle 101 is gradually reduced as shown by an arrow 62. As shown by an arrow 64, this suppresses the increase of the vehicle speed and maintains the vehicle speed to be substantially constant when the vehicle 101 comes down from the obstacle 30. More specifically, the vehicle speed when the vehicle 101 get on top of the obstacle 30 and the vehicle speed when the vehicle 101 comes down on the other side of the obstacle 30 can be made substantially the same. Accordingly, it is possible to alleviate discomfort of occupants when the vehicle 101 comes down from the obstacle 30. Since the braking torque is determined in accordance with the driving torque, if the driving torque is reduced as shown by an arrow 62, the braking torque is reduced as shown by an arrow 63 as well.

Also in the method for reducing the driving torque according to the second embodiment, the time to start reduction of the driving torque, that is, a time at which the braking torque is applied to the vehicle 101, may be determined in the aforementioned procedure. That is, the control to apply the braking torque to the vehicle 101 can be started when the vehicle 101 has moved the distance necessary for the vehicle 100 to get on top of the obstacle 30.

Also in the method for reducing the driving torque according to the second embodiment, when the vehicle 101 goes over successive obstacles 30, the amount of reduction in the driving torque, that is, the braking torque applied, can be attenuated. Further, it is also possible to extend the distance that the vehicle 101 needs to move before application of the braking torque is started, instead of reducing the braking torque.

Further, the invention is not limited to the mechanism that performs either of the first control, in which the driving torque output from the engine 1 is reduced when the vehicle climbs up the obstacle, or the second control, in which the braking torque is increased in the same vehicle condition. In another example, when it is determined that the vehicle is climbing up an obstacle, both of the first control and the second control may be performed. This makes it possible to effectively suppress the increase of the vehicle speed when the vehicle comes down the other side of the obstacle.

What is claimed is:

1. A vehicle controller comprising:
an obstacle-determining portion that determines whether a vehicle is climbing up an obstacle; and
a driving torque reducing portion that performs a driving torque reduction control that reduces the driving torque when the obstacle-determining portion determines that the vehicle is climbing up the obstacle;
wherein:
the obstacle-determining portion determines that the vehicle is climbing up the obstacle when the driving torque exceeds a threshold value of the driving torque, in a condition where a vehicle speed is maintained to be substantially constant.

2. A vehicle controller comprising:
an obstacle-determining portion that determines whether a vehicle is climbing up an obstacle; and
a driving torque reducing portion that performs a driving torque reduction control that reduces the driving torque when the obstacle-determining portion determines that the vehicle is climbing up the obstacle;
wherein:
the obstacle-determining portion determines that the vehicle is climbing up the obstacle when a vehicle speed increases from substantially 0, and the driving torque exceeds a threshold value of the driving torque.

3. The vehicle controller according to claim 1, wherein:
the threshold value of the driving torque exceeds at least a driving torque that is output when the vehicle starts moving from a standstill.

4. The vehicle controller according to claim 1, wherein:
the threshold value of the driving torque is determined in accordance with at least one of a grade of a road, a gear ratio of a transmission, a vehicle weight, and a diameter of a tire on a wheel.

5. The vehicle controller according to claim 1, wherein:
the driving torque reducing portion executes at least one of a first control that reduces a torque output from an engine and a second control that increases a braking torque applied to the vehicle, so that the driving torque reducing portion reduces the driving torque.

6. The vehicle controller according to claim 5, wherein:
the first control reduces the driving torque by controlling a throttle valve.

7. The vehicle controller according to claim 5, wherein:
the first control reduces the driving torque by reducing a boost pressure of a turbocharger.

8. The vehicle controller according to claim 5, wherein:
the second control sets a value obtained by subtracting a road grade torque from the driving torque as the braking torque.

9. The vehicle controller according to claim 1,
wherein:
the driving torque reducing portion performs the driving torque reduction control in accordance with a grade of a road.

10. A vehicle controller comprising:
an obstacle-determining portion that determines whether a vehicle is climbing up an obstacle; and
a driving torque reducing portion that performs a driving torque reduction control that reduces the driving torque when the obstacle-determining portion determines that the vehicle is climbing up the obstacle;
wherein:
the driving torque reducing portion estimates a height of an obstacle based on the driving torque applied when it is determined that the vehicle is climbing up the obstacle, and estimates a distance that the vehicle needs to move in order to get on top of the obstacle based on the estimated height, and starts the driving torque reduction control when the vehicle has moved the estimated distance.

11. The vehicle controller according to claim 1, wherein:
the driving torque reducing portion reduces an amount of reduction in the driving torque when the vehicle goes over successive obstacles.

12. The vehicle controller according to claim 10, wherein:
the driving torque reducing portion extends the estimated distance that the vehicle needs to move before the driving torque is reduced when the vehicle goes over successive obstacles.

13. A method for controlling a driving torque of a vehicle, comprising the steps of:
determining whether the vehicle is climbing up an obstacle based on whether the vehicle speed increases from substantially 0, and the driving torque exceeds a threshold value of the driving torque; and
performing a driving torque reduction control that reduces the driving torque when the vehicle speed increases from substantially 0, and the driving torque exceeds a threshold value of the driving torque.

14. The method for controlling the driving torque of the vehicle according to claim 13, further comprising the steps of:
estimating a height of the obstacle in accordance with the driving torque applied when it is determined that the vehicle is climbing up the obstacle;
estimating a distance that the vehicle needs to move in order to get on top of the obstacle in accordance with the height of the obstacle; and
starting the driving torque reduction control when the vehicle has moved the estimated distance.

15. A vehicle controller, comprising:
obstacle-determining means for determining whether a vehicle is climbing up an obstacle; and
driving torque reducing means for performing a driving torque reduction control that reduces the driving torque when the obstacle-determining means determines that the vehicle is climbing up the obstacle;
wherein the obstacle-determining means determines that the vehicle is climbing up the obstacle when a vehicle speed increases from substantially 0, and the driving torque exceeds a threshold value of the driving torque.

16. The vehicle controller according to claim 2, wherein:
the threshold value of the driving torque exceeds at least a driving torque that is output when the vehicle starts moving from a standstill.

17. The vehicle controller according to claim 2, wherein:
the threshold value of the driving torque is determined in accordance with at least one of a grade of a road, a gear ratio of a transmission, a vehicle weight, and a diameter of a tire on a wheel.

18. The vehicle controller according to claim 2, wherein:
the driving torque reducing portion executes at least one of a first control that reduces a torque output from an engine and a second control that increases a braking torque applied to the vehicle, so that the driving torque reducing portion reduces the driving torque.

19. The vehicle controller according to claim 2, wherein:
the driving torque reducing portion performs the driving torque reduction control in accordance with a grade of a road.

20. The vehicle controller according to claim 2, wherein:
the driving torque reducing portion reduces an amount of reduction in the driving torque when the vehicle goes over successive obstacles.

* * * * *